US011869011B2

(12) United States Patent
Lee et al.

(10) Patent No.: US 11,869,011 B2
(45) Date of Patent: Jan. 9, 2024

(54) RULE BASED TRANSACTION AUTHORIZATION SERVER

(71) Applicant: Ramp Business Corporation, New York, NY (US)

(72) Inventors: Calvin Jun-Gong Lee, Weehawken, NJ (US); Veeral Dilip Patel, Bergenfield, NJ (US); Paul Alexander Meier, Brooklyn, NY (US); Karim Atiyeh, Miami Beach, FL (US); Ariel Petren Langer, San Marino, CA (US); Ori Ephraim Goldfield, New York, NY (US); Geoffrey Jacques Charles, Brooklyn, NY (US)

(73) Assignee: RAMP BUSINESS CORPORATION, New York, NY (US)

( * ) Notice: Subject to any disclaimer, the term of this patent is extended or adjusted under 35 U.S.C. 154(b) by 107 days.

(21) Appl. No.: 17/351,027

(22) Filed: Jun. 17, 2021

(65) Prior Publication Data

US 2022/0405753 A1  Dec. 22, 2022

(51) Int. Cl.
*G06Q 20/40*    (2012.01)
*G06N 20/00*    (2019.01)
*G06F 16/27*    (2019.01)

(52) U.S. Cl.
CPC .......... *G06Q 20/405* (2013.01); *G06F 16/27* (2019.01); *G06N 20/00* (2019.01); *G06Q 20/401* (2013.01)

(58) Field of Classification Search
None
See application file for complete search history.

(56) References Cited

U.S. PATENT DOCUMENTS

2001/0051917 A1* 12/2001 Bissonette ............. G06Q 40/02
 705/30
2006/0015463 A1*  1/2006 Gupta ................... G06Q 20/382
 705/52

(Continued)

OTHER PUBLICATIONS

Author Unknown, Reducing Fraud with Online Sales from Professional Solutions, May 24, 2021, https://www.profsolutions.com/industries/business-owners/financial/reducing-fraud-with-online-sales/ (Year: 2021).*

(Continued)

*Primary Examiner* — Gregory S Cunningham, II
(74) *Attorney, Agent, or Firm* — FENWICK & WEST LLP

(57) ABSTRACT

A system for stable and streamlined transaction approval includes a rule management server and an authorizer server that operates independently of the rule management server. The rule management server is configured to receive a transaction rule associated with an account specified by a client entered through a portal generated by a graphical user interface. The server is further configured to identify data relevant to the transaction rule and transmit the transaction rule and the data identified to an authorizer server. The authorizer server is configured to receive transaction data related to a pending transaction of the credit card and apply the transaction rule to the transaction data and the data identified by the rule management server to determine whether to approve the pending transaction. The authorizer server operates independent of the rule management server and can be optimized to approve transactions quickly and operate in a stable condition.

20 Claims, 8 Drawing Sheets

(56) References Cited

U.S. PATENT DOCUMENTS

| | | | | |
|---|---|---|---|---|
| 2009/0024499 | A1* | 1/2009 | Ribble | G06Q 40/00 |
| | | | | 705/35 |
| 2013/0325681 | A1* | 12/2013 | Somashekar | H04M 15/851 |
| | | | | 705/35 |
| 2013/0346313 | A1* | 12/2013 | Wankmueller | G06Q 20/4014 |
| | | | | 705/44 |
| 2014/0089193 | A1* | 3/2014 | Boding | G06Q 20/382 |
| | | | | 705/44 |
| 2014/0339315 | A1* | 11/2014 | Ko | G06F 1/1628 |
| | | | | 235/492 |
| 2017/0344991 | A1* | 11/2017 | Mark | G06Q 20/425 |
| 2022/0207385 | A1* | 6/2022 | Manoharan | G06N 3/08 |

OTHER PUBLICATIONS

Author Unknown, Fraud Module from usaepay, May 5, 2021, retrieved from https://web.archive.org/web/20210508071735/https://help.usaepay.info/merchant/guide/fraud-manager/fraud-modules/ (Year: 2021).*

* cited by examiner

New Card Details

Card Type
Virtual Card                                                     ⌄

Issue virtual cards for up to 500 people at once.

( johndoe@abcd.com  x )  ⊕

Card Name
Name

Amount                          Frequency                            ⌄

Advance Controls  ⓘ

Auto-Lock Date (None)                                                🗓

Lock card after a certain date (optional)

Transaction Amount Limit (None)

Any transactions greater than this amount will be declined (optional).

Category & Vendor Controls (All)          [ Add Restriction ]

Restrict spending to specific merchant categories or merchants (optional).

Cancel                                    [ Create Card ]

*FIG. 7*

Restrictions

Block or restrict spending on this card to merchant categories and specific merchants.

Category Restrictions

Restrict to Categories ⌄

Transactions from all other categories will be blocked.

 Airlines 🗑

 Car Rental 🗑

⊕ Add Another

Merchant Restrictions

Allow Additional Merchants ⌄

Transactions from this merchant will always be allowed.

 ABC Ice Cream Chain 🗑

ⓘ What can this card spend on?     Save Changes

*FIG. 8*

RULE BASED TRANSACTION AUTHORIZATION SERVER

TECHNICAL FIELD

The present disclosure generally relates to transaction approval in network communications and, particularly, real-time transaction approval based on rule-based restrictions.

BACKGROUND

A server nowadays often handles thousands of requests per minute. Transactions and communications among devices sometimes require a server's authentication and approval before the transactions can be completed. On one hand, to reduce the delay associated with transactions, a communication protocol may be associated with rather stringent specifications that may require a server to respond within a short time frame. On the other hand, the wealth of data, especially big data, often makes locating and retrieving relevant data a complex process that could slow down a server. Parties in transactions also demand flexibility and customizability of transactions, making processing a transaction even more demanding. Even a state-of-the-art server could have difficulties in meeting the timing requirements in a transaction approval process.

The issue is particularly challenging when a system is not originally designed to perform certain functionalities. For example, participants in the system often add customized features to the system in a non-standardized way. Data communication may not have a standard protocol or format, leading to data appearing noisy for the receiving party because the receiving party may not have full information of the data schema and structure. A server may apply complex rules in analyzing the received data associated with a transaction, but the analysis inevitably slows down an approval process.

SUMMARY

Embodiments are related to rule-based transaction approval processes and architectures that improve the speed of transaction approval processes and the stability of the server handling the transaction review. In one embodiment, a transaction approval system includes a first server and a second server. The first server is configured to receive various client inputs on policies and settings that describe how the client wants to handle different transactions and accounts. The first server is the main server that is responsible for storing a large amount of data, creating rules associated with transactions, and performing complex tasks. The first server filters the data based on the rules set by a client and may also compile useful information such as tables that can be used for streamlined analyses. The second server operates independently from the first server and serves as an authorizer server that specializes in approving transactions. The second server may be developed with architecture and algorithms that are efficient at reviewing and approving transactions. The second server partially replicates the relevant data from the first server to reduce the complexity of data and increases the speed of the transaction approval process. The replicated data may be stored locally with the second server to reduce the latency in data retrieval.

This general architecture has applications in various areas, such as a payment transaction approval process. For example, in a credit card transaction, the credit card company often sets forth a short response time limit for a server to approve or reject the transaction. In one embodiment, the first server receives various customized transaction rules from an organization client that limit how cards issued under the organization may be used. The customized transaction rules are special and advanced rules that are not available in conventional credit card systems. As such, the card company does not provide a standard or protocol on how a special rule may be implemented. To meet the response time requirement, a second specialized server is established to receive relevant rules and filtered data from the first server. The second server replicates the data to avoid sending the first server a data retrieval query when approving a transaction. The reduction in data complexity and the increase in data retrieval speed allow the second server to meet the stringent timing requirement while being able to apply complex customized rules in reviewing card transactions.

BRIEF DESCRIPTION OF THE DRAWINGS

FIG. 7 illustrates a card creation portal, in accordance with an embodiment.

FIG. 8 illustrates a category and vendor control portal, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Overview

Figure 1:
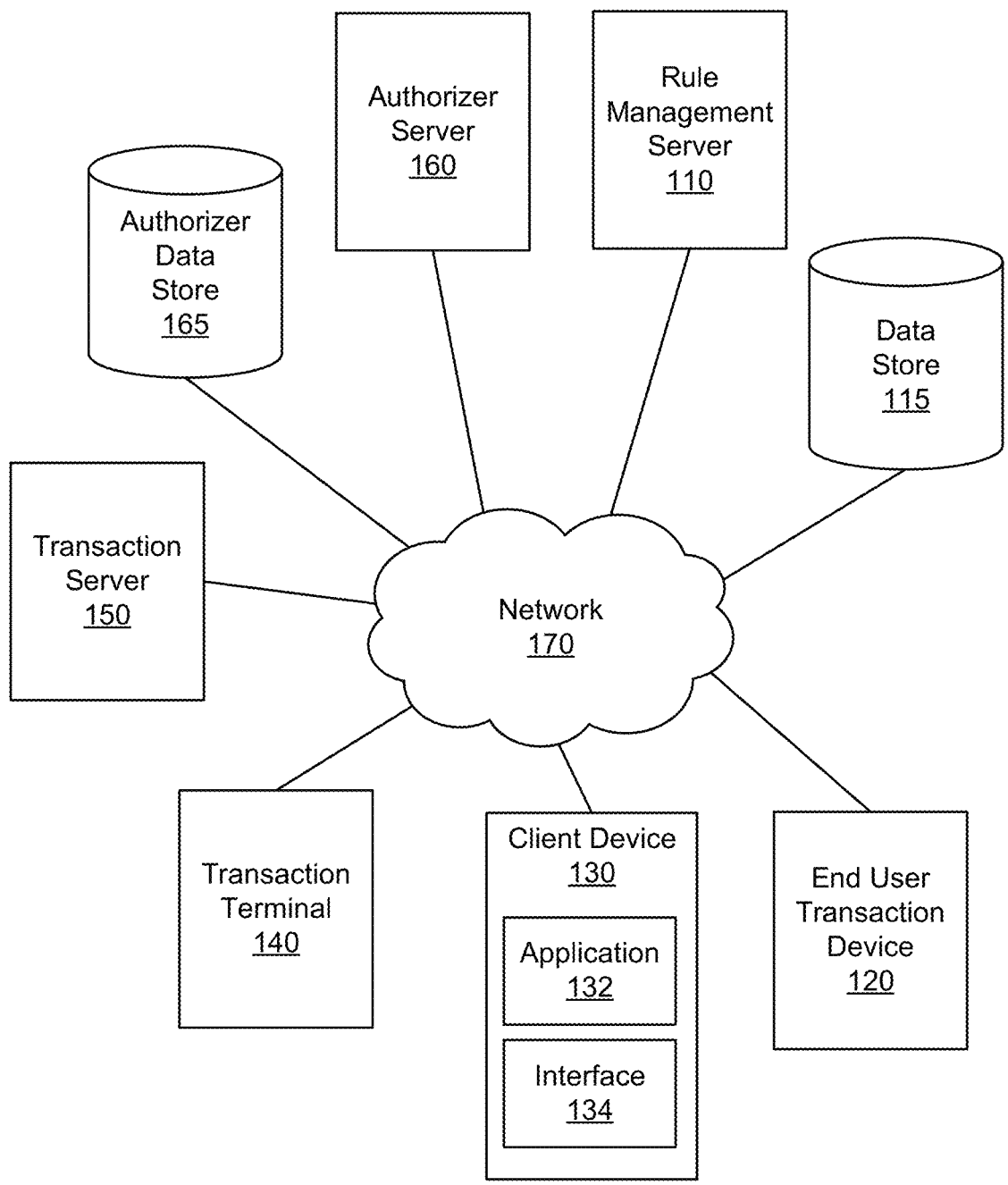
FIG. 1 is a block diagram illustrating an example system environment, in accordance with an embodiment.

FIG. 1 is a block diagram that illustrates a spending system management environment 100, in accordance with an embodiment. The system environment 100 includes a rule management server 110, a data store 115, an end user transaction device 120, a client device 130, a transaction terminal 140, a transaction server 150, an authorizer server 160, and an authorizer data store 165. The entities and components in the system environment 110 communicate with each other through network 170. In various embodiments, the system environment 100 includes fewer or additional components. In some embodiments, the system environment 100 also includes different components. While each of the components in the system environment 100 is described in a singular form, the system environment 100 may include one or more of each of the components. For example, in many situations, the rule management server 110 can issue multiple end user transaction devices 120 for different end users. Different client devices 130 may also access the rule management server 110 simultaneously.

The rule management server 110 includes one or more computers that perform various tasks related to managing accounting, payments, and transactions of various clients of the rule management server 110. For example, the rule management server 110 creates credit cards and accounts for an organization client and manages transactions of the cards of the organization client based on rules set by the client. Rules include pre-authorization and restrictions on certain transactions. In one embodiment, the rule management server 110 provides its clients with various payment and spending management services as a form of cloud-based software, such as software as a service (SaaS). Examples of components and functionalities of the rule management server 110 are discussed in further detail below with reference to FIG. 2. The rule management server 110 may also be referred to as a payment management server, a first computing server, or simply a computing server. The rule management server 110 may provide a SaaS platform for various clients to manage their accounts and transaction rules related to the accounts.

The data store 115 include one or more computing devices that include memories or other storage media for storing various files and data of the rule management server 110. The data stored in the data store 115 includes accounting information, transaction data, credit card profiles, card rules and restrictions, merchant profiles, merchant identification rules, spending records and other related data associated with various clients of the rule management server 110. In various embodiments, the data store 115 may take different forms. In one embodiment, the data store 115 is part of the rule management server 110. For example, the data store 115 is part of the local storage (e.g., hard drive, memory card, data server room) of the rule management server 110. In some embodiments, the data store 115 is a network-based storage server (e.g., a cloud server). The data store 115 may be a third-party storage system such as AMAZON AWS, DROPBOX, RACKSPACE CLOUD FILES, AZURE BLOB STORAGE, GOOGLE CLOUD STORAGE, etc. The data in the data store 115 may be structured in different database formats such as a relational database using the structured query language (SQL) or other data structures such as a non-relational format, a key-value store, a graph structure, a linked list, an object storage, a resource description framework (RDF), etc. In one embodiment, the data store 115 uses various data structures mentioned above.

An end user transaction device 120 is a device that enables the holder of the device 120 to perform a transaction with a party, such as making a payment to a merchant for goods and services based on information and credentials stored at the end user transaction device 120. An end user transaction device 120 may also be referred to as an end user payment device. Examples of end user transaction devices 120 include payment cards such as credit cards, debit cards, and prepaid cards, other smart cards with chips such as radio frequency identification (RFID) chips, portable electronic devices such as smart phones that enable payment methods such as APPLE PAY or GOOGLE PAY, and wearable electronic devices. The rule management server 110 issues end user transaction devices 120 such as credit cards for its organizational clients and may impose spending control rules and restrictions on those cards. While credit cards are often used as examples in the discussion of this disclosure, various architectures and processes described herein may also be applied to other types of end user transaction devices 120.

A client device 130 is a computing device that belongs to a client of the rule management server 110. A client uses the client device 130 to communicate with the rule management server 110 and performs various payment and spending management related tasks such as creating credit cards and associated payment accounts, setting transaction rules and restrictions on cards, setting pre-authorized or prohibited merchants or merchant categories, and managing transactions and records. The user of the client device 130 may be a manager, an accounting administrator, or a general employee of an organization. While in this disclosure a client is often described as an organization, a client may also be a natural person or a robotic agent. A client may be referred to an organization or its representative such as its employee. A client device 130 includes one or more applications 132 and interfaces 114 that may display visual elements of the applications 132. The client device 130 may be any computing device. Examples of such client devices 130 include personal computers (PC), desktop computers, laptop computers, tablets (e.g., iPADs), smartphones, wearable electronic devices such as smartwatches, or any other suitable electronic devices.

The application 132 is a software application that operates at the client device 130. In one embodiment, an application 132 is published by the party that operates the rule management server 110 to allow clients to communicate with the rule management server 110. For example, the application 132 may be part of a SaaS platform of the rule management server 110 that allows a client to create credit cards and accounts and perform various payment and spending management tasks. In various embodiments, an application 132 may be of different types. In one embodiment, an application 132 is a web application that runs on JavaScript and other backend algorithms. In the case of a web application, the application 132 cooperates with a web browser to render a front-end interface 134. In another embodiment, an application 132 is a mobile application. For example, the mobile application may run on Swift for iOS and other APPLE operating systems or on Java or another suitable language for ANDROID systems. In yet another embodiment, an application 132 may be a software program that operates on a desktop computer that runs on an operating system such as LINUX, MICROSOFT WINDOWS, MAC OS, or CHROME OS.

An interface 134 is a suitable interface for a client to interact with the rule management server 110. The client may communicate to the application 132 and the rule management server 110 through the interface 134. The interface 134 may take different forms. In one embodiment, the interface 134 may be a web browser such as CHROME, FIREFOX, SAFARI, INTERNET EXPLORER, EDGE, etc. and the application 132 may be a web application that is run by the web browser. In one embodiment, the interface 134 is part of the application 132. For example, the interface 134 may be the front-end component of a mobile application or a desktop application. In one embodiment, the interface 134 also is a graphical user interface (GUI) which includes graphical elements and user-friendly control elements. In one embodiment, the interface 134 does not include graphical elements but communicates with the data management server 120 via other suitable ways such as application program interfaces (APIs), which may include conventional APIs and other related mechanisms such as webhooks.

In some embodiments, the client device 130 and the end user transaction device 120 belong to the same domain. For example, a company client can request the rule management server 110 to issue multiple company credit cards for the employees. A domain refers to an environment in which a system operates and/or an environment for a group of units and individuals to use common domain knowledge to organize activities, information and entities related to the domain in a specific way. An example of a domain is an organization, such as a business, an institute, or a subpart thereof and the data within it. A domain can be associated with a specific domain knowledge ontology, which could include representations, naming, definitions of categories, properties, logics, and relationships among various concepts, data, transactions, and entities that are related to the domain. The boundary of a domain may not completely overlap with the boundary of an organization. For example, a domain may be a subsidiary of a company. Various divisions or departments of the organization may have their own definitions, internal procedures, tasks, and entities. In other situations, multiple organizations may share the same domain.

A transaction terminal 140 is an interface that allows an end user transaction device 120 to make electronic fund transfers with a third party. Electronic fund transfer can be credit card payments, automated teller machine (ATM) transfers, direct deposits, debits, online transfers, peer-to-peer transactions such as VENMO, instant-messaging fund transfers such as FACEBOOK PAY and WECHAT PAY, wire transfer, electronic bill payment, automated clearing house (ACH) transfer, cryptocurrency transfer, blockchain transfer, etc. Depending on the type of electronic fund transfers, a transaction terminal 140 may take different forms. For example, if an electronic fund transfer is a credit card payment, the transaction terminal 140 can be a physical device such as a point of sale (POS) terminal (e.g., a card terminal) or can be a website for online orders. An ATM, a bank website, a peer-to-peer mobile application, and an instant messaging application can also be examples of a transaction terminal 140. The third party is a transferor or transferee of the fund transfer. For example, in a card transaction, the third party may be a merchant. In an electronic fund transfer such as a card payment for a merchant, the transaction terminal 140 may generate a transaction data payload that carries information related to the end user transaction device 120, the merchant, and the transaction. The transaction data payload is transmitted to other parties, such as credit card companies, banks, the authorizer server 160 for approval or denial of the transaction.

The transaction server 150 is a server that manages and forwards data of electronic fund transfer transactions to relevant parties for approval or denial of the underlying transactions. For example, the transaction server 150 belongs to a credit card company and receives a transaction data payload from a transaction terminal 140 for a pending transaction. The transaction server 150 forwards the transaction data payload to various parties such as banks and the authorizer server 160 to review the transaction. To ensure the end user experience of the card and a smooth approval process, the transaction server 150 may request the relevant parties to respond to the approval or denial within a timeframe such as by setting a timeout. Approval within the timeframe is considered as a real-time approval process. The transaction server 150 and the transaction terminal 140 often belong to different parties. For example, the transaction server 150 may belong to a card company and the transaction terminal 140 may belong to a merchant.

The authorizer server 160 is a server that applies various rules set forth by a client of the rule management server 110 to approve or deny various fund transfer transactions in real-time as the transaction server 150 forwards the transaction data payload to the authorizer server 160. The authorizer server 160 communicates with the rule management server 110 to retrieve rules for transaction approval and related data for the authorizer server 160 to make the approval decisions. In one embodiment, the authorizer server 160 and the rule management server 110 may be related but operate independently. For example, in one embodiment, the rule management server 110 and the authorizer server 160 are operated by the same parties but the two servers are associated with different architectures, code, and hardware. As such, the authorizer server 160 may be configured to operate as an independent server that specializes in approving fund transfer transactions (e.g., credit card payments) in real-time. The operation of the authorizer server 160 is not affected by, for example, the downtime of the rule management server 110. In one embodiment, the rule management server 110 and the authorizer server 160 communicate with API. Examples of components and functionalities of the authorizer server 160 are discussed in further detail below with reference to FIG. 2. The authorizer server 160 may also referred to as a second computing server or simply a computing server.

The authorizer data store 165 is a data store for the authorizer server 160. The authorizer data store 165 stores data that are relevant for the authorizer server 160 to make decisions on approving fund transfer transactions. In one embodiment, the authorizer data store 165 includes a partially replicated database of the data store 115 that is associated with the rule management server 110. The approval of a fund transfer transaction such as a card payment often is a quick decision process that requires the authorizer server 160 to respond within a time limit that is within a few seconds or within milliseconds. The authorizer data store 165 replicates the relevant data from the data store 115 to reduce the latency in data retrieval and transfer of the data. In one embodiment, the authorizer data store 165 is local to the authorizer server 160. In other embodiments, the authorizer data store 165 is a Cloud database but has a simplified data structure and fewer data compared to the data store 115.

Various servers in this disclosure may take different forms. In one embodiment, a server is a computer that executes code instructions to perform various processes described in this disclosure. In another embodiment, a server is a pool of computing devices that may be located at the same geographical location (e.g., a server room) or be distributed geographically (e.g., clouding computing, distributed computing, or in a virtual server network). In one embodiment, a server includes one or more virtualization instances such as a container, a virtual machine, a virtual private server, a virtual kernel, or another suitable virtualization instance.

The network 170 provides connections to the components of the system environment 100 through one or more sub-networks, which may include any combination of local area and/or wide area networks, using both wired and/or wireless communication systems. In one embodiment, a network 170 uses standard communications technologies and/or protocols. For example, a network 170 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 170 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 170 may be represented using any suitable format, such as hypertext markup language (HTML), extensible markup language (XML), JavaScript object notation (JSON), structured query language (SQL). In some embodiments, some of the communication links of a network 170 may be encrypted using any suitable technique or techniques such as secure sockets layer (SSL), transport layer security (TLS), virtual private networks (VPNs), Internet Protocol security (IPsec), etc. The network 170 also includes links and packet switching networks such as the Internet. In some embodiments, a data store belongs to part of the internal computing system of a server (e.g., the authorizer data store 165 may be part of the authorizer server 160). In such cases, the network 170 may be a local network that enables the server to communicate with the rest of the components.

Example Server Components

Figure 2:
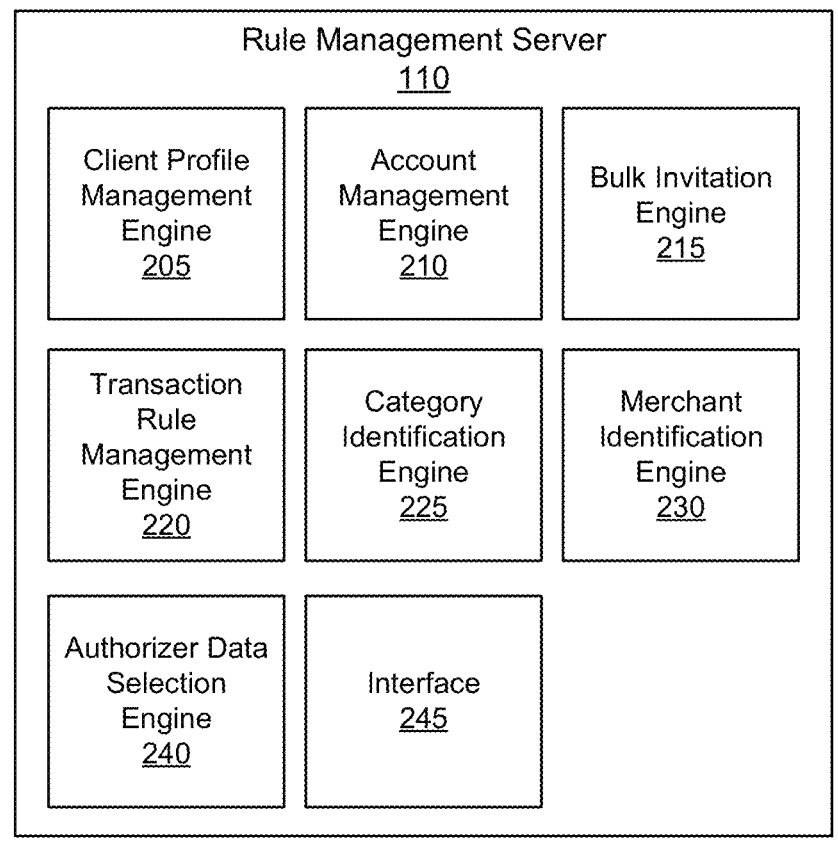
FIG. 2 includes block diagrams illustrating components of an example rule management server and an example authorizer server, in accordance with an embodiment.
Figure 2:
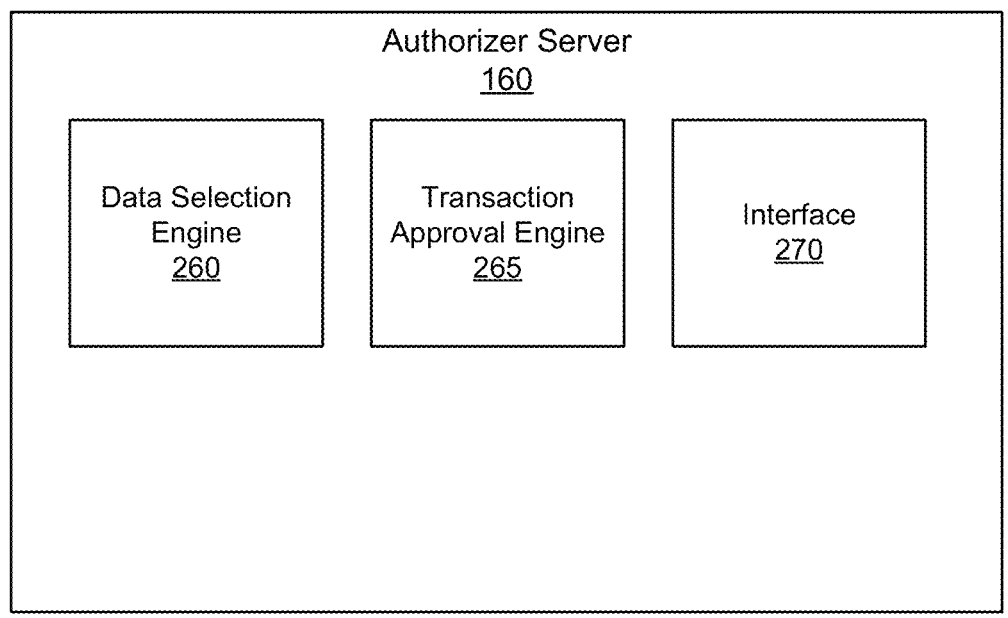

FIG. 2 is a block diagram illustrating components of a rule management server 110 and various components of an authorizer server 160, in accordance with an embodiment. The rule management server 110 includes a client profile management engine 205, an account management engine 210, a bulk invitation engine 215, a transaction rule management engine 220, a category identification engine 225, a merchant identification engine 230, an authorizer data selection engine 240, and an interface 245. The authorizer server 160 includes a data selection engine 260, a transaction approval engine 265, and an interface 270. In various embodiments, the two servers may include fewer or additional components. The two servers also may include different components. The functions of various components may be distributed in a different manner than described below. Moreover, while each of the components in FIG. 2 may be described in a singular form, the components may present in plurality. The components may take the form of a combination of software and hardware, such as software (e.g., program code comprised of instructions) that is stored on memory and executable by a processing system (e.g., one or more processors).

The client profile management engine 205 stores and manages named entity data and transaction data of clients of the rule management server 110. The rule management server 110 serves various organizations that have different associated named entities such as employees, vendors, and customers. For example, the client profile management engine 205 may store the employee hierarchy of a client to determine the administrative privilege of an employee in creating a credit card account and in setting transaction rules. An administrator of the client may specify that certain employees from the financial department and managers have the administrative privilege to create cards for other employees. The client profile management engine 205 assigns metadata tags to transaction data of an organization to categorize the transactions in various ways, such as by transaction types, by merchants, by date, by amount, by card, by employee groups, etc. The client profile management engine 205 monitors the spending of a client by category and also by the total spending. The spending amounts may affect the results of transaction rules that are specified by a client's system administrator. For example, a client may limit the total monthly spending of an employee group. The rule management server 110 may deny further card payments after the total spending exceeds the monthly budget.

The account management engine 210 creates and manages accounts including payment accounts such as credit cards that are issued by the rule management server 110. An account is associated with a named entity such as an employee and corresponds to a card. A client may use the rule management server 110 to issue domain-specific payment accounts such as company cards. The client enters account information such as the cardholder's name, role and job title of the cardholder in the client's organization, limits of the card, and transaction rules associated with the card. In response, the account management engine 210 creates the card serial number, credentials, a unique card identifier, and other information needed for the generation of a payment account and corresponding card. The account management engine 210 associates the information with the cardholder's identifier. The rule management server 110 communicates with a credit card company (e.g., VISA, MASTERCARD) to associate the card account created with the identifier of the rule management server 110 so that transactions related to the card will be forwarded to the authorizer server 160 for approval. The account management engine 210 may also order the production of the physical card that is issued under the payment management engine 110. The cards and payment accounts created are associated with the transaction rules that are specified by the client's administrator.

The bulk invitation engine 215 allows the rule management server 110 to create a large number of payment accounts and associated credit cards in a single selection. A client's administrator may select a large number of employees and request the rule management server 110 to create cards for the selected employees. The bulk invitation engine 215 gives the card holders correct permissions and cards with appropriate limits. The administrator can edit collectively or individually the card limits and rules associated with the group of cards. The group of cards may be associated with the same group identifier and can be activated, edited, revoked at the same time. The bulk invitation engine 215 also allows the administrator to set up the manager relationships correctly for those cards. The accounts of a card holder and her manager can be created at the same time with the proper limit and administrative privilege. For example, the manager is provided with the privilege to review and adjust the transaction rules of cards of her team members.

The transaction rule management engine 220 allows an administrator of an organization to specify rules for transaction for accounts of the organizations. An account may be a payment account such as a credit card account. A transaction rule may be a spending rule for one or more cards created by the rule management server 110. Rules include pre-authorization and restrictions on certain transactions. Rules are based on transaction categories, merchant categories, specific merchants, time limits, date limits, amount limits, and/or other suitable criteria, whether the criteria are permanent or temporary, dynamic or predefined, party-specific or not. For example, an administrator, in creating or editing a card, may specify a date and time limit on the card. The date and time limit can be permanent (e.g., a card being invalid after a certain time and date), periodic (e.g., a card being invalid during weekend and holidays), temporary (e.g., a card being invalid between two dates), and dynamic (e.g., a card being valid or invalid based on other triggering conditions). The administrator may also specify a transaction amount limit for each transaction. The transaction amount limit is different from the card limit. The card limit specifies the total amount that a card holder can spend for a period of time (e.g., monthly limit). The administrator may further specify a transaction amount limit for the maximum amount of spending for each transaction. In some cases, the limit of a card may also be aggregated toward a total limit of the organization. The administrator may specify various limits using a portal provided by the rule management server 110. The administrator may also specify transaction category, merchant category, and specific merchants that are pre-approved or blacklisted for a specific card. The transaction rule management engine 220 stores various rules associated with each card as part of variables associated with the card.

The category identification engine 225 identifies whether a transaction belongs to a particular merchant category provided by the rule management server 110. Example categories may include "Books and Newspapers," "Car Rental," "Clothing," "Electronics," "Entertainment," etc. An administrator may toggle each of the categories to authorize or restrict the use of a particular card. The rule management server 110 receives transaction data of credit payment and determines the category to which the transaction belongs. In one embodiment, the merchant categories provided by the rule management server 110 are different from the merchant category codes (MCC). In one embodiment, the rule management server 110 uses a lookup table to determine whether a transaction belongs to a category provided by the rule management server 110 based on MCC. For example, the MCC provides more than 200 categories while the customized categories of the rule management server 110 may include a small number of categories (e.g., less than 50 categories). A lookup table is constructed to map the MCC categories to the customized categories of the rule management server 110.

The merchant identification engine 230 identifies specific merchants associated with various transactions. The rule management server 110 may impose a merchant-specific restriction on a card. For example, an administrator of a client may specify that a specific card can only be used with a specific merchant. The rule management server 110 parses transaction data from different clients to identify patterns in the transaction data specific to certain merchants to determine whether a transaction belongs to a merchant. In a card purchase, the transaction data includes merchant identifiers (MID), merchant category code (MCC), and the merchant name. However, those items are often insufficient to identify the actual merchant of a transaction. The MID is often an identifier that does not uniquely correspond to a merchant. In some cases, the MID is used by the POS payment terminal company such that multiple real-world merchants share the same MID. In other cases, a merchant (e.g., a retain chain) is associated with many MIDs with each branch or even each registry inside a branch having its own MID. The merchant name also suffers the same defeats as the MID. The merchant name may also include different abbreviations of the actual merchant name and sometimes misspelling. The string of the merchant name may include random numbers and random strings that are not related to the actual real-world name of the merchant. The merchant identification engine 230 applies various algorithms and machine learning models to determine the actual merchant from the transaction data. For example, the merchant identification engine 230 may search for patterns in transaction data associated with a particular merchant to determine whether a transaction belongs to the merchant. For example, a merchant may routinely insert a code in the merchant name or a store number in the merchant name. The merchant identification engine 230 identifies those patterns to parse the actual merchant name. Examples of how a merchant is identified are discussed in further detail in association with FIGS. 4 and 5.

The authorizer data selection engine 240 selects data that is required by the authorizer server 160 to make approval decisions of transactions. The authorizer server 160 is required to provide approval or denial of many transactions related to various clients of the rule management server 110 in real-time with certain time limits. The rule management server 110 allows clients to specify various rules restricting the use of cards. The rules are normally not available for other cards because the rules are advanced controls that are not provided by credit card companies. The determination of the rules may require a server to retrieve relevant data from the rule management server 110 and apply the rules to the retrieved data. The authorizer data selection engine 240 reviews the rules associated with a particular client and determines, such as based on category identification engine 225 and merchant identification engine 230, data columns that should be sent to the authorizer server 160. In one embodiment, in response to an administrator of a client adjusting or creating a rule of the card, the authorizer data selection engine 240 triggers an update to the authorizer server 160.

The interface 245 includes interfaces that are used to communicate with different parties and servers. The interface 245 may take the form of a SaaS platform that provides clients with access of various functionalities provided by the rule management server 110. The interface 245 provides a portal in the form of a graphical user interface (GUI) for clients to create payment accounts, manage transactions, send bulk invitations and specify rules of each card. Examples of the GUI elements of the interface 245 are shown in FIGS. 7 and 8. The interface 245 is in communication with the application 132 and provides data to render the application 132. The interface 245 also communicates with the authorizer server 160 to provide data for the authorizer server 160 to perform transaction approval. The data may be provided by a push process such as an updated payload to the authorizer server 160 or a pull process upon the request of the authorizer server 160. The rule management server 110 may also send data payload to the authorizer server 160 periodically.

In one embodiment, the interface 245 also includes an API for clients of the rule management server 110 to communicate with the rule management server 110 through machines. The API allows the clients to retrieve the rule management server 110 stored in the data store 115, send query requests, and make settings through a programming language. Various settings, creation of cards, rules on the cards, and other functionalities of the various engines 205 through 240 may be changed by the clients through sending commands to the API. The API allows the clients to automate various processes such as spending control. For example, a client may retrieve spending data from the rule management server 110 and dynamically adjust, using code instructions specified by the client, the transaction rules of one or more cards. In another example, a client may integrate its own data and dynamically adjust the transaction rules of one or more cards. For instance, the client may log or provide the data log of an employee's working schedule. The data may be provided to the rule management server 110 to dynamically adjust the time that a card issued to the employee is authorized to use.

Referring to the authorizer server 160, the authorizer server 160 may be an independent server that specializes in approving transactions based on card transaction rules that are specified by a client through the rule management server 110. The rule management server 110 may include a large amount of data and the data retrieval and calculation process of the rule management server 110 may not be fast enough to satisfy the time constraints in approval of a card transaction in real-time. The authorizer server 160 may include a partially replicated database that includes data relevant to transaction rules and approval of transactions to speed up the approval process. In one embodiment, the authorizer server 160 is in communication with the rule management server 110 but is not in direct communication with any of the clients of the rule management server 110. While the authorizer server 160 is illustrated as having only the data selection engine 260, the transaction approval engine 265, and the interface 270, the authorizer server 160 in some embodiments also include the functionality of the rule management server 110 such as any of the engines and interfaces 205 through 245. For example, when the authorizer server 160 receives a transaction data payload, the authorizer server 160 may need to identify the actual real-world merchant from the noisy data of the transaction data payload. The identification of the merchant functionality may be similar to or the same as the merchant identification engine 230.

The data selection engine 260 selects data needed to apply a transaction rule and approve a transaction. The data selection engine 260 makes a query to the authorizer data store 165 to retrieve the relevant data. The data selection engine 260 parses the card number in a transaction data payload to identify the payment account and the client of the rule management server 110. The data selection engine 260 retrieves the rules that are associated with the cards and generates a database query (e.g., a SQL query) based on the criteria of the rules. In some embodiments, the data selection engine 260 also selects what data to be downloaded from the rule management server 110. For example, data in the data store 115 is store as a form of structured data with column names. The data selection engine 260, based on the transaction rules, identifies columns that should be replicated from the data store 115 to the authorizer data store 165. Since the data in authorizer data store 165 may be simplified and smaller in size than the data in the data store 115, the approval speed of the authorizer server 160 and the reliability and stability of the authorizer server 160 are improved.

The transaction approval engine 265 approves or denies a transaction based on various criteria including the transaction rules, spending limits, the overall limit of an organization set forth by the client, credential verification, and fraud detection. The transaction approval engine 265 identifies relevant data in the transaction payload and may make a determination with respect to the nature of the transaction. For example, the transaction approval engine 265, in response to a transaction rule that restricts a specific merchant or a merchant category, makes a prediction on the identity of the real-world merchant based on the noisy data in the transaction data payload. In turn, the transaction approval engine 265 makes an approval determination based on the identity of the merchant. A rule may also be a time limit. The transaction approval engine 265 parse the timing and date data from the transaction payload to determine whether the time and date violate any rule specified by the client. A rule may also be a per-transaction limit or a limit that counts towards the overall spending limit of an organization. The authorizer server 160 receives the data such as the overall spending of an organization from the rule management server 110 and makes an approval based on the data.

The interface 270 of the authorizer server 160 allows the authorizer server 160 to communicate with the appropriate parties and servers. The authorizer server 160 is in communication with the rule management server 110. When a new card of the rule management server 110 is created, the rule management server 110 specifies the Internet address of the interface 270 as the destination address for a credit company to forward the transaction data payload for approval or denial. Hence, although the creation and management of cards are performed through the rule management server 110, the approval process of the transactions associated with the cards are performed through the authorizer server 160.

While the authorizer server 160 and the rule management server 110 are illustrated as separate servers, in one embodiment, the authorizer server 160 may be part of the rule management server 110. For example, in one embodiment, the rule management server 110 may perform the card transaction approval instead of setting up a separate server.

Rule-Based Transaction Approval Process

Figure 3:
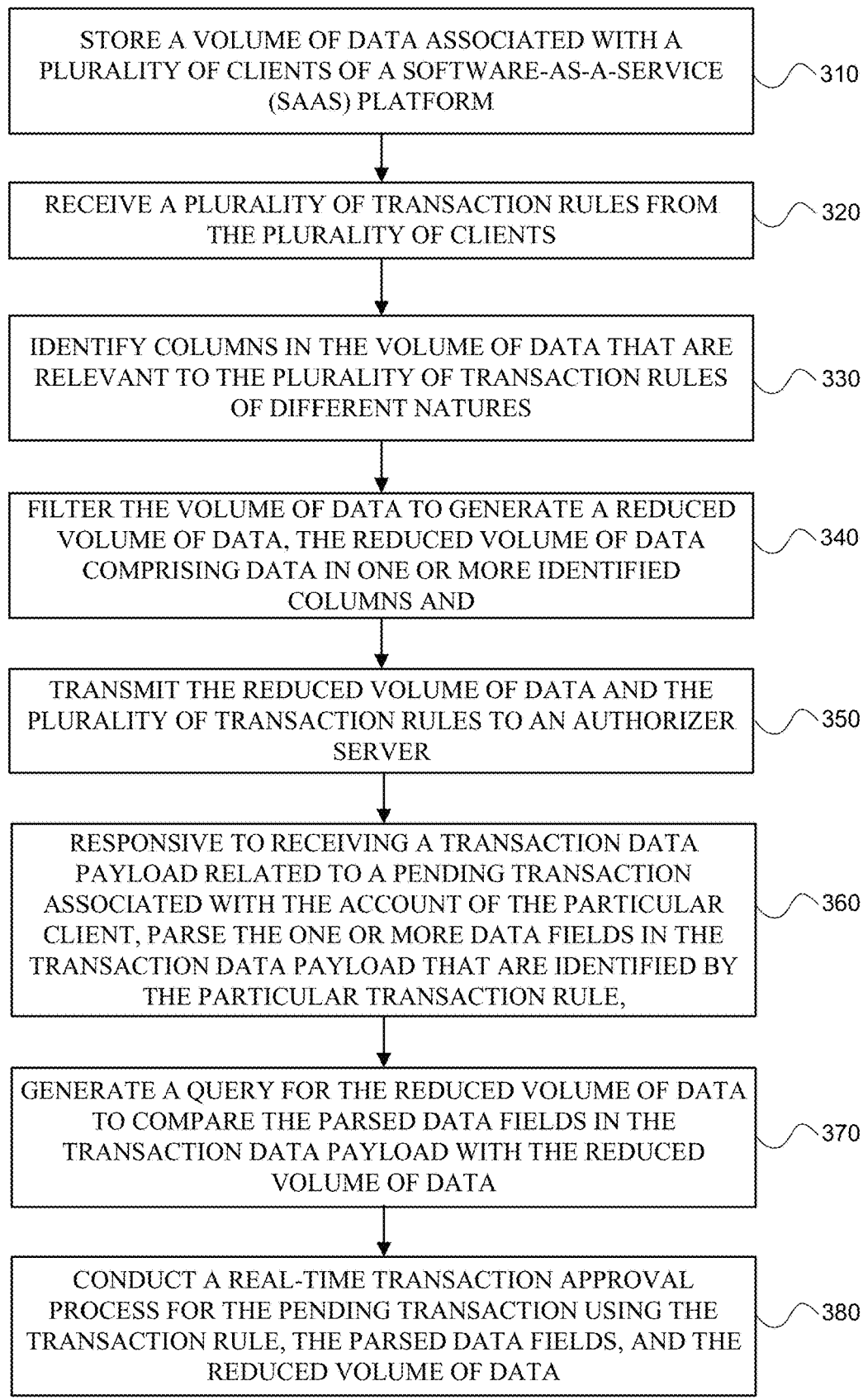
FIG. 3 is a flowchart depicting a computer-implemented process for performing rule-based transaction approval using both a rule management server and an authorizer server, in accordance with an embodiment.

FIG. 3 is a flowchart depicting a computer-implemented process 300 for performing rule-based transaction approval using both a rule management server 110 and an authorizer server 160, in accordance with an embodiment. For the particular embodiment discussed in FIG. 3, the rule management server 110 and the authorizer server 160 are different servers and operate independently. For example, the rule management server 110 includes one or more computers. A computer associated with the rule management server 110 includes a first processor and first memory. The first memory stores a first set of code instructions that, when executed by the first processor, causes the first processor to perform some of the steps described in the process 300. The authorizer server 160 uses different hardware and includes a different computer (or one or more computers) that includes a second processor and second memory. The second memory stores a second set of code instructions that are different from the first set of code instructions. For example, the second set of code instructions may be developed independently using even a different programming language so that the authorizer server 160 is tailored to performing transaction approval in a speedy and reliable manner. The second set of code instructions, when executed by the second processor, cause the second processor to perform other steps described in the process 300. While two independent servers are described as an example architecture associated with the process 300, in some embodiments a single server can also perform the entire process 300.

The rule management server 110 stores 310 a volume of data associated with a plurality of clients of a software-as-a-service (SaaS) platform. The data may be past transaction data payloads that are related to various clients. The transaction data may also include other data provided by the clients, such as profile data, accounting data, and other types of data mentioned in this disclosure. Owing to a potentially large number of clients that the rule management server 110, the volume of the transaction data can be huge. As such, query and retrieval of data may involve a notable delay. In some cases, the delay is relatively long compared to the response deadline for approving a transaction. For example, some queries' data retrieval time may be longer than the transaction response deadline.

The rule management server 110 receives 320 a plurality of transaction rules from the plurality of clients. The plurality of transaction rules may include a particular transaction rule associated with an account of a particular client. The particular client is an example client of the SaaS platform provided by the rule management server 110. A transaction rule may be a spending rule and an account may be a credit card or a payment account. The particular transaction rule may be entered by the client through a portal generated by a GUI of the SaaS platform. For example, the rule management server 110 may be an application server such as a SaaS server that is in communication with an application 132 executed on a client device 130. The application 132 generates a GUI that includes a portal for a client to create cards and manage associated transaction rules associated with the cards. Examples of the portal are further illustrated in FIGS. 7 and 8. The portal allows the client to select various rules in restricting the spending of organizational cards created through the rule management server 110. The transaction rules of different clients may be of different natures. For example, one transaction rule may be a whitelist or a blacklist of a set of one or more specific merchants. Another transaction rule may be a merchant category restriction. In one embodiment, the merchant category restriction directly corresponds to MCC. In another embodiment, the merchant category is a customized category mapped from the MCC. Other examples of transaction rules are further discussed in FIG. 2 in association with the transaction rule management engine 220. A client may specify one or more transaction rules on a particular account and different rules on different accounts. The rule management server 110 may store a large number of rules of different natures for various clients.

The rule management server 110 identifies 330 columns in a data store that are relevant to the plurality of transaction rules of different natures. The rule management server 110 identifies data that is relevant to various transaction rules. The portal of the rule management server 110 provides selection menus for a client to create and adjust one or more transaction rules. The code instruction of each rule may include tags that identify column names of a database that stores relevant data for approving card transactions associated with the transaction rule. For example, if a transaction rule is a merchant level restriction, the tags may include columns that store data for merchant names, possible merchant identifiers, known prefix or suffix to remove in transaction data, and other known patterns associated with the transaction data payload of a particular merchant. The selection of the data may be dynamic. For example, the client, through the API provided by the interface 245, may provide data to the rule management server 110. The provided data may dynamically affect the rule setting and selection of data stored in the rule management server 110.

The rule management server 110 filters 340 the volume of transaction data to generate a reduced volume of data. The reduced volume of data includes data in one or more identified columns that are identified in step 330. For example, the rule management server 110 filters what is relevant for the authorizer server 160 to conduct the transaction approval process and exclude data that are irrelevant. The reduced volume of data is a subset of the total volume of data associated with the rule management server 110. The rule management server 110 reduces the size of the volume of data to increase the speed of data retrieval and computation of the authorizer server 160.

The rule management server 110 transmits 350 the reduced volume of data and the plurality of transaction rules to the authorizer server 160. The authorizer server 160 is configured to approve transactions in real time. A transaction may be considered real-time if the transaction is completed without a timeframe set by a relevant party or a system, such as a timeout limit or a response deadline. For example, in a credit card transaction process, a party usually has less than 5 seconds to approve a transaction. Such an approval within the timeframe is considered a real-time approval. The rule management server 110 and the authorizer server 160 may each include their respective data stores, such as the data store 115 and the authorizer data store 165. The rule management server 110 identifies columns in the volume of data that are relevant to the authorizer server 160 for approving transactions in real-time. The rule management server 110 replicates those columns and data and transmits the data to the authorizer server 160 along with the transaction rules specified by the clients. As such, the authorizer data store 165 may partially replicate the data store 115 associated with the payment management server 110. Since the amount of data in the authorizer data store 165 is reduced, the computation and data retrieval of the authorizer server 160 is streamlined and becomes more reliable. When the rule management server 110 receives an update to a transaction rule, the rule management server 110 may trigger another transmission of updated data to the authorizer server 160. Some data are also periodically updated. For example, the rule management server 110 may monitor the total spending of its various clients and periodically provide updates to the authorizer server 160.

The authorizer server 160, in response to receiving a transaction data payload related to a pending transaction associated with the account of the particular client, parses 360 the one or more data fields in the transaction data payload that are identified by the particular transaction rule. The transaction data is included in a transaction data payload that has a plurality of fields. Example fields include card numbers, the MID, the MCC, the merchant name, zip code, and a transaction identifier. As discussed in FIG. 2 with reference to the merchant identification engine 230, the data in the transaction data payload can be noisy. For example, in addition to those discussed in FIG. 2, the zip code of the transaction could also be unreliable, especially for online purchases where the zip code sometimes represents the estimated zip code of the customer while other times represents the zip code of the headquarters of the merchant. The authorizer server 160 uses data stored in the authorizer data store 165 to identify common patterns in the string values of the transaction data payload and parse useful data from the payload.

The authorizer server 160 generates 370 a query for the reduced volume of data to compare the parsed data fields in the transaction data payload with the reduced volume of data. The query may be directed to retrieving relevant data or transaction rules that are applicable to the particular pending transaction. For example, a transaction rule may specify a date limit on a credit card. The authorizer server 160 parses the date of the transaction in the transaction data payload and generates a query to determine the date limit specified in the transaction rule. In another example, a transaction rule may specify a whitelist of merchants that are authorized to perform transactions with an end user. The whitelist is sent to the authorizer server as part of the reduced volume of data. The authorizer server 160 parses the identity of the merchant in the transaction data payload. The authorizer server 160 generates a query to determine whether the identified merchant is in the whitelist.

The authorizer server 160 conducts 380 a real-time transaction approval process for the pending transaction using the transaction rule, the parsed data fields, and the reduced volume of data. The authorizer server 160 applies the transaction rule to the relevant transaction data parse from the transaction data payload to determine whether to approve the pending transaction. The transaction rule may limit the timing of the transaction, type of the transaction, amount of the transaction, the specific merchant involved in the transaction, the merchant category, etc. Based on the information parsed by the authorizer server 160 from the transaction data payload, the authorizer server 160 matches the transaction data to the transaction rule and/or data in the reduced volume of data. The authorizer server 160 in turn determines the nature of the transaction and provides an approval or denial of the transaction. For example, a transaction rule may be a merchant-level restriction. The authorizer server 160 identifies the specific real-world merchant identity from the transaction data and determines whether to approve the transaction. Examples of methods of how a server may identify the identity of a merchant from the noisy transaction data payload are further in FIGS. 4 and 5.

Merchant Identification Process

A named entity identification process may be used to determine the identities of named entities included in a transaction data payload. In one embodiment, the rule management server 110 determines a named entity identification rule by analyzing patterns in the volume of data associated with the plurality of clients. For example, the volume of data may include past transaction data payloads of different clients. The rule management server 110 may analyze the past transaction data payloads to determine a common pattern associated with payloads of a particular named entity. The named entity identification rule may specify, for example, the location of a string, the prefix or suffix to removed, and other characteristics of the data payload. The rule management server 110 in turn provides the named entity identification rule to the authorizer server. The authorizer server 160, upon the receipt of a transaction data payload, identifies a noisy data field in the transaction data. A noisy data field is a field that includes information more than the named entity. For example, a noisy data field may include a representation of a named entity, such as the name, an abbreviation, a nickname, a subsidiary name, or an affiliation of the named entity. The noisy data field may further include one or more irrelevant strings that may be legible but irrelevant or may even appear to be gibberish. The authorizer server 160 parses the representation of the named entity based on the named entity identification rule. The authorizer server 160 may use the representation of the named entity as part of the query for the reduced volume of data described in step 370 of FIG. 3 to determine the identity of the named entity. The transaction approval process is based on the identity of the named entity. This general framework may be used by one or more computing servers to identify named entities in transaction data payloads. While the rule management server 110 and the authorizer server 160 are described in this framework, in some embodiments, the framework may also be performed by a single server.

Figure 4:
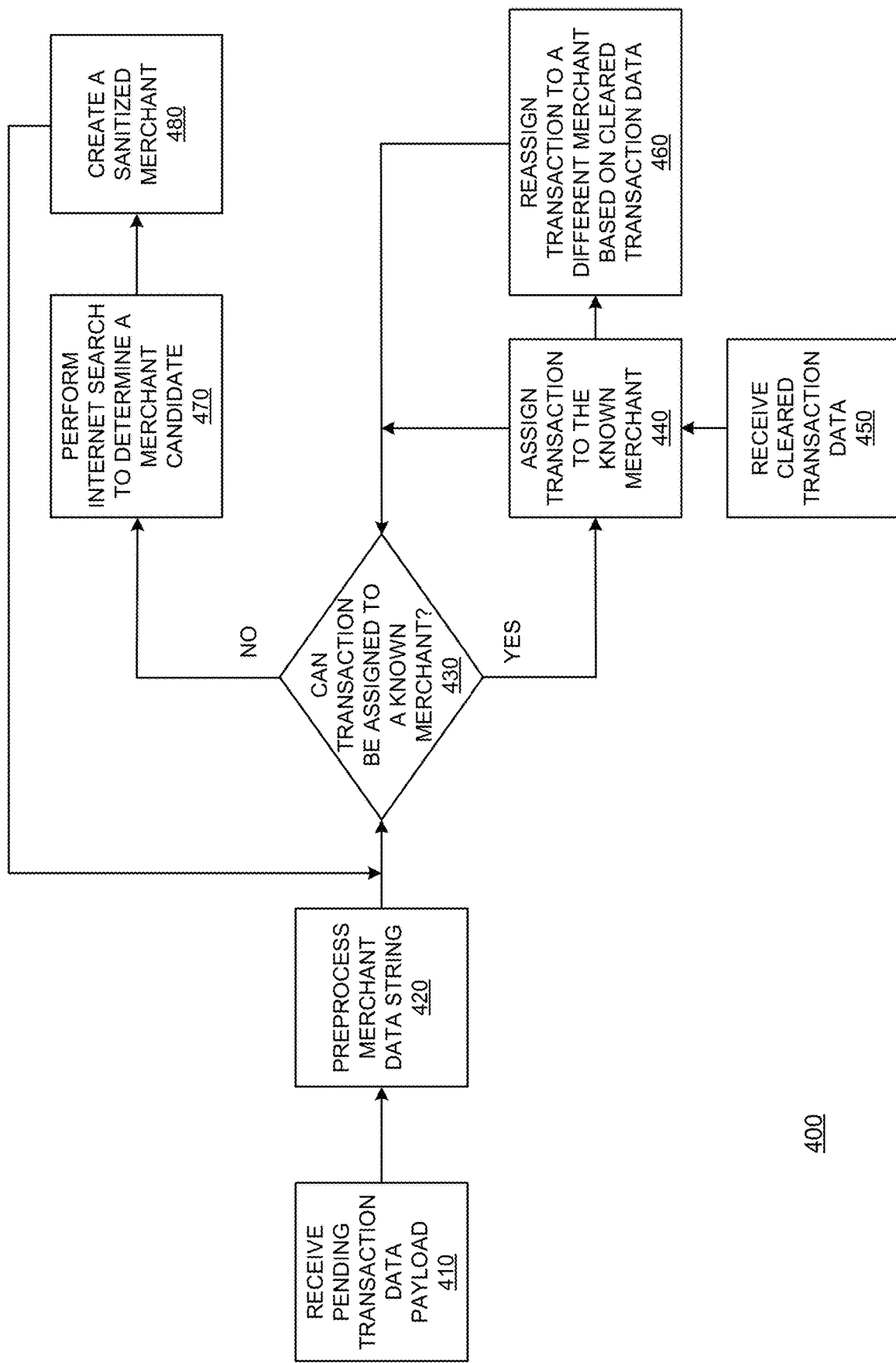
FIG. 4 is a flowchart depicting a computer-implemented process for identifying real-world identities of merchants from transaction data payloads, in accordance with an embodiment.

FIG. 4 is a flowchart depicting a computer-implemented process 400 for identifying real-world identities of merchants from transaction data payloads, in accordance with an embodiment. The process 400 illustrated in FIG. 4 is an example of the foregoing framework. The process 400 may be performed by the rule management server 110. As discussed below, the authorizer server 160 may also have a similar capability to perform the entirety or part of the process 400 to identify a merchant in real-time to determine whether to approve a transaction based on a merchant level restriction. As such, while FIG. 4 is discussed with the operation of the rule management server 110, the authorizer server 160 may also perform such a process. Also, in some embodiments, the rule management server 110 and the authorizer server 160 cooperate to perform the process 400. While identifying merchants is used as an example in FIG. 4, the general process may be used for other named entity identifications.

The rule management server 110 receives 410 a pending transaction data payload 410. A transaction may be associated with two transaction data payloads, one representing the pending transaction and another representing the cleared transaction. The transaction data payload includes various fields, such as the card numbers, the MID, the MCC, the merchant name, zip code, and a transaction identifier. For example, a pending transaction data payload from a merchant named "ABCD" may include (ACD* PENDING-.ABCD.COM, 023320212, 5423, 41211), which respectively represents a noisy string of merchant name "ACD* PENDING.ABCD.COM," a MID 023320212, an MCC 5423 and a zip code 41210. The string of merchant name includes a prefix ACD*, which is a non-standardized abbreviation of the merchant name. In another example, a pending transaction data payload from a merchant named "GIO ICE CREAM" may include (SK *GIO ICE CREAM SAN RAM, 25255899442270, 5499, 94584), which respectively represents a noisy string of merchant name "SK *GIO ICE CREAM SAN RAM," a MID 25255899442270, an MCC 5499, and a zip code 94584. The string of merchant name includes a prefix SK*, which may be related to the POS company that sets up the registry for the merchant. The string of merchant name may also include an incomplete city name of the branch of the merchant "SAN RAM."

The rule management server 110 pre-processes 420 merchant data strings. Various algorithms may be used to pre-process the merchant data string, such as the merchant name string. For example, a first function may detect whether a prefix exists in the merchant name string. The rule management server 110 may store a list of known prefixes that are associated with various POS companies and common retailers that may not be the true merchant. The rule management server 110 locates the prefix and removes it from the string. Another function may determine whether a part of a string is likely to be the name of the merchant. For example, the function may identify the count of numbers in a word compared to the length of the word. If the count to length ratio is higher than a threshold or the word includes entirely numbers, the rule management server 110 may determine that the word is not part of a merchant name and remove the word from the string. The rule management server 110 may also include other functions that identify known words and common words in the merchant name string. For example, the functions may locate known cities and landmarks in the merchant name string. The rule management server 110 may also store a list of known merchants and data of how their names, abbreviations, or alias usually appear in a merchant name string.

The rule management server 110 determines, at decision stage 430, whether the transaction can be assigned to a known merchant. The rule management server 110 may store an existing merchant name table that includes common ways of how names of known merchants appear in transaction data payload, patterns of the transaction data payload, lists of known MID and MCC associated with a known merchant, etc. In some cases, an incoming transaction data payload matches a data entry in the existing merchant name table with respect to the MID, the MCC, the zip code and the parsed merchant name in the merchant name string. In other cases, the parsed merchant name matches a data entry in the existing merchant name table and the pattern of the transaction data payload also matches the typical pattern of the merchant. In those cases, the rule management server 110 determines that the transaction belongs to a known merchant. The existing merchant name table may be constructed from thousands of or even millions of verified transaction data payloads associated with different clients of the rule management server 110. The rule management server 110 can identify merchants based on the collective data from various transactions of different clients. The rule management server 110 may analyze a large number of past transaction data payloads to generate various named entity identification rules.

In response to the rule management server 110 being able to assign the transaction to a known merchant, the rule management server 110 assigns 440 the transaction to the known merchant. If the identification of the merchant is associated with a transaction process (e.g., the authorizer server 160 performing the process 400), the server compares the identified merchant to a whitelist or blacklist of merchants specified in the transaction rule of the card. The server in turn approves or denies the pending transaction.

In some cases, the rule management server 110 also receives 450 cleared transaction data payloads. A cleared transaction data payload includes the same transaction data identifier as the pending transaction data payload, but may include different information that may help the rule management server 110 to further identify or verify the identity of the merchant. For example, in some cases, a large merchant may engage in different business activities through multiple subsidiaries. The pending transaction data payloads in some cases do not contain the nature of the transactions or the identity of the subsidiary. The cleared transaction data payload may include additional information such as the identity of the subsidiary. Based on the additional information, the rule management server 110 may reassign 460 the transaction to a different merchant based on the cleared transaction data. The results of the assignments of a known merchant or re-assignment of the known merchant are fed back to the existing merchant name table to further enrich the table.

In response to the rule management server 110 not being able to assign the transaction to a known merchant, the rule management server 110 performs 470 an Internet search to determine a merchant candidate. The Internet search may be based on the parsed merchant name in the merchant name string, location information, the zip code, the MCC, and any suitable combination thereof. The Internet search may identify an Internet domain that is associated with an unknown merchant name and automatically determine the identity of the merchant.

The rule management server 110 creates 480 a sanitized merchant identity. The sanitization process may be based on a verification of the merchant name from the merchant's website, the use of public databases such as maps and addresses, and other suitable processes to identify the identity of a real-world merchant. In some cases, the sanitization process may also involve a manual process for a person to provide the merchant information. When a merchant candidate is not identified by the Internet search or the confidence of the merchant candidate is low, the algorithm may flag the merchant candidate for a manual review. The results of the sanitized merchant is fed back to the existing merchant name table to enrich the table.

While the process 400 is discussed with the rule management server 110, the authorizer server 160 may also perform the entirety or part of the process 400. In one embodiment, the authorizer server 160 performs part of the process 400 to identify whether a pending transaction data payload can be assigned to a known merchant. In one embodiment, to reduce the time for the transaction approval process, the authorizer server 160 may skip the Internet search. Since the approval process occurs in real-time, the authorizer server 160 may also skip the review of the cleared transaction data.

Machine Learning Model for Merchant Identification

Alternative to or in addition to the process 400, the rule management server 110 may also use a machine learning model to identify the merchant associated with a transaction. The rule management server 110 may accumulate a large number of transaction data payloads through the process 400 and other processes. The rule management server 110 may use the past transaction data payloads as a set of training samples to iteratively train one or more machine learning models that can be used to identify an identity of the merchant based on an incoming transaction data payload. A training sample may include a label of a merchant identity and a past transaction data payload. The label may be generated by a manual process or by an automatic process such as the process 400. In some cases, part of the training samples includes labels while other training samples do not include labels but are grouped with labeled samples through a process such as clustering and word embeddings.

In various embodiments, a wide variety of machine learning techniques may be used. Examples of which include different forms of unsupervised learning, clustering, embeddings such as word embeddings, support vector regression (SVR) model, random forest classifiers, support vector machines (SVMs) such as kernel SVMs, gradient boosting, linear regression, logistic regression, and other forms of regressions. Deep learning techniques such as neural networks, including convolutional neural networks (CNN), recurrent neural networks (RNN), and long short-term memory networks (LSTM), may also be used. Each payload may be converted to a feature vector that includes different dimensions. By way of example, strings in the transaction data payloads may be converted to word embeddings using known techniques Word2Vec or another technique. The word embeddings can be one or more dimensions of the feature vector. The MCC, MID, and the zip code may be turned into various dimensions of a feature vector representing a transaction data payload. The feature vectors can be inputted into the machine learning model to iteratively train the machine learning model.

In various embodiments, the training techniques for iteratively training a machine learning model may be supervised, semi-supervised, or unsupervised. In supervised training, the machine learning algorithms may be trained with a set of training samples that are labeled. For example, a past transaction data payload can be labeled with a known merchant. The labels for each training sample may be binary or multi-class. In some cases, an unsupervised learning technique may be used. The samples used in training are not labeled. Various unsupervised learning techniques such as clustering may be used. In some cases, the training may be semi-supervised with the training set having a mix of labeled samples and unlabeled samples.

A machine learning model is associated with an objective function, which generates a metric value that describes the objective goal of the training process. For example, the training intends to reduce the error rate of the model in generating predictions of the merchants. In such a case, the objective function may monitor the error rate of the machine learning model. In merchant identification, the objective function of the machine learning algorithm may be the training error rate in predicting the merchant in a training set. Such an objective function may be called a loss function. Other forms of objective functions may also be used, particularly for unsupervised learning models whose error rates are not easily determined due to the lack of labels. In various embodiments, the error rate may be measured as cross-entropy loss, L1 loss (e.g., the absolute distance between the predicted value and the actual value), L2 loss (e.g., root mean square distance).

Figure 5:
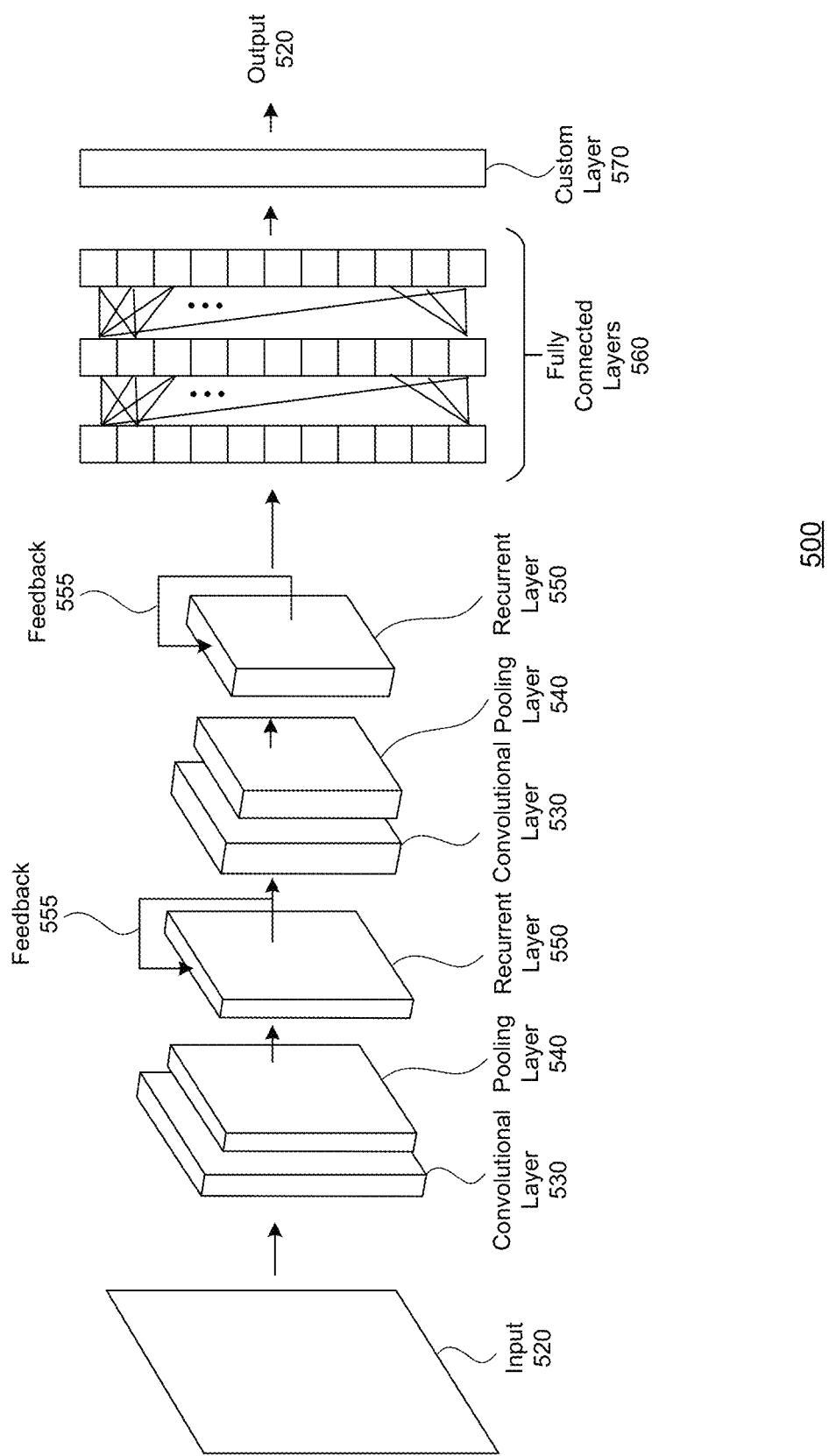
FIG. 5 is a conceptual diagram illustrating a machine learning model, in accordance with an embodiment.

Referring to FIG. 5, a structure of an example CNN is illustrated, according to an embodiment. While the structure of a neural network is illustrated as an example, the machine learning model may also be another model such as an SVM, a random forest model, or another suitable model. The CNN 500 may receive an input 510 and generate an output 520. The CNN 500 may include different kinds of layers, such as convolutional layers 530, pooling layers 540, recurrent layers 550, full connected layers 560, and custom layers 570. A convolutional layer 530 convolves the input of the layer with one or more kernels to generate convolved features. Each convolution result may be associated with an activation function. A convolutional layer 530 may be followed by a pooling layer 540 that selects the maximum value (max pooling) or average value (average pooling) from the portion of the input covered by the kernel size. The pooling layer 540 reduces the spatial size of the extracted features. In some embodiments, a pair of convolutional layer 530 and pooling layer 540 may be followed by a recurrent layer 550 that includes one or more feedback loop 555. The recurrent layer 550 may be gated in the case of an LSTM. The feedback 555 may be used to account for temporal relationships of the transactions in a process model 222. The layers 530, 540, and 550 may be followed in multiple fully connected layers 560 that have nodes (represented by squares in FIG. 5) connected to each other. The fully connected layers 560 may be used for classification and object identification. In one embodiment, one or more custom layers 570 may also be presented for the generation of a specific format of output 520.

The order of layers and the number of layers of the CNN 500 in FIG. 5 is for example only. In various embodiments, a CNN 500 includes one or more convolutional layer 530 but may or may not include any pooling layer 540 or recurrent layer 550. If a pooling layer 540 is present, not all convolutional layers 530 are always followed by a pooling layer 540. A recurrent layer may also be positioned differently at other locations of the CNN. For each convolutional layer 530, the sizes of kernels (e.g., 3×3, 5×5, 7×7, etc.) and the numbers of kernels allowed to be learned may be different from other convolutional layers 530.

A machine learning model includes certain layers, nodes, kernels, and/or coefficients. Training of a machine learning model, such as the CNN 500, includes iterations of forward propagation and backpropagation. Each layer in a neural network may include one or more nodes, which may be fully or partially connected to other nodes in adjacent layers. In forward propagation, the neural network performs the computation in the forward direction based on outputs of a preceding layer. The operation of a node may be defined by one or more functions. The functions that define the operation of a node may include various computation operations such as convolution of data with one or more kernels, pooling, recurrent loop in RNN, various gates in LSTM, etc. The functions may also include an activation function that adjusts the weight of the output of the node. Nodes in different layers may be associated with different functions.

Each of the functions in the neural network may be associated with different coefficients (e.g. weights and kernel coefficients) that are adjustable during training. In addition, some of the nodes in a neural network each may also be associated with an activation function that decides the weight of the output of the node in forward propagation. Common activation functions may include step functions, linear functions, sigmoid functions, hyperbolic tangent functions (tanh), and rectified linear unit functions (ReLU). After input is provided into the neural network and passes through a neural network in the forward direction, the results may be compared to the training labels or other values in the training set to determine the neural network's performance. The process of prediction may be repeated for other transactions in the training sets to compute the value of the objective function in a particular training round. In turn, the neural network performs backpropagation by using gradient descent such as stochastic gradient descent (SGD) to adjust the coefficients in various functions to improve the value of the objective function.

Multiple iterations of forward propagation and backpropagation may be performed. Training may be completed when the objective function has become sufficiently stable (e.g., the machine learning model has converged) or after a predetermined number of rounds for a particular set of training samples. The trained machine learning algorithm can be used for determining a merchant using an incoming transaction data payload as an input.

Dynamic Rule and API

Figure 6:
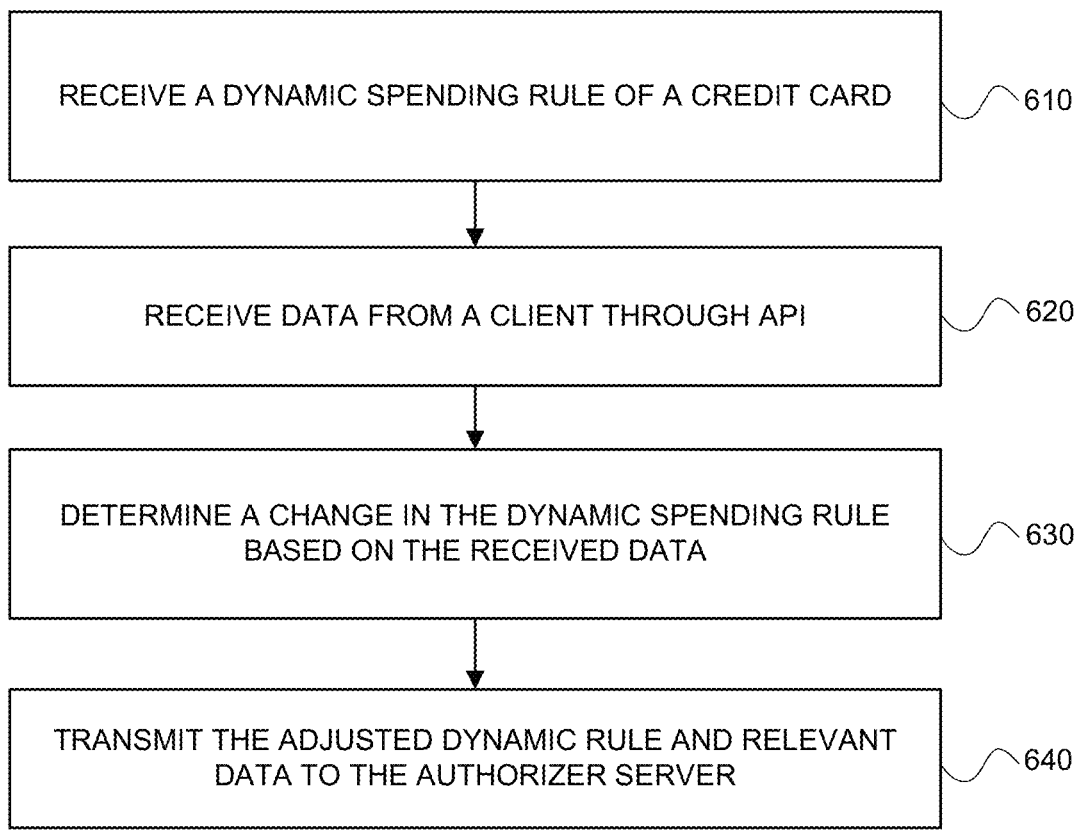
FIG. 6 is a flowchart depicting an example dynamical rule determination process, in accordance with an embodiment.

FIG. 6 is a flowchart depicting an example dynamical rule determination process 600, in accordance with an embodiment. One or more transaction rules associated with a card may be dynamically adjusted based on various factors and conditions. Those transaction rules may be referred to as dynamic rules. In one embodiment, the rule management server 110 provides an API that allows a client to dynamically adjust one or more transaction rules or to provide data for the rule management server 110 to adjust the transaction rules based on various conditions.

By way of example, the rule management server 110 receives 610 a dynamic transaction rule of a card. For instance, the dynamic rule may limit the spending of the card only to hours that the cardholder employee is on working shift. The working hours of the employee may dynamically change. The rule management server 110 receives 620 data from the client through API. For example, the data may include the working hours and schedule of the employee. The rule management server 110 determines 630 a change in the dynamic transaction rule based on the received data. For example, the rule management server 110 may detect a change in the schedule of the employee. The rule management server 110 identifies the relevant data and the change in the transaction rule. The rule management server 110 transmits 640 the adjusted dynamic rule and relevant data to the authorizer server 160.

While time limit is used as an example of the dynamic rule, the embodiment may be applied to other situations such as automatically adjusting transaction rule based on employee's projects and job nature, vendor relationship, the total spending of a client, subscription information (e.g., whether a client has unsubscribed a service), account policies, and other suitable criteria.

Account Creation Portals

FIGS. 7 and 8 are diagrams illustrating example graphical user interfaces that generate a portal for a client to create a new credit card and to specify transaction rules associated with the card, in accordance with an embodiment. The GUIs shown may be part of a SaaS platform that is operated by the rule management server 110. FIG. 7 illustrates a card creation portal, where a client may create a virtual or a physical card. The card creation portal includes a field for the client to the card limit and specifies the period (e.g., yearly, monthly, weekly) for the card limit. The card creation portal also includes a text field that allows the client to enter multiple emails to perform a bulk invitation to a large number of cardholders. Each card holder will receive their own card and their cards will be subject to the transaction rules set in the card creation portal. The card creation portal provides various transaction rule options in the advanced controls panel. Non-limiting examples of the transaction rule options include a date and time limit for the rule management server 110 to automatically lock the card. The options also include a per-transaction amount limit and category and vendor controls.

FIG. 8 is a category and vendor control portal for the client to specify the category and merchant level restrictions of one or more cards. The restrictions can be a pre-authorized list (whitelist) or a prohibited list (blacklist). The client may add one or more categories to the whitelist or blacklist. The client may also select one or more specific merchants. The merchant restrictions may be supplemental to the category restrictions. For example, the client can select certain permitted merchant categories and additional specific merchants for the whitelist despite the merchants not belonging to the selected categories. Other more complex combinations of categories and merchants may also be used.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Embodiments according to the invention are in particular disclosed in the attached claims directed to a method and a computer program product, wherein any feature mentioned in one claim category, e.g. method, can be claimed in another claim category, e.g. computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the disclosed embodiments but also any other combination of features from different embodiments. Various features mentioned in the different embodiments can be combined with explicit mentioning of such combination or arrangement in an example embodiment. Furthermore, any of the embodiments and features described or depicted herein can be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In one embodiment, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed by the specific order claimed or described in the disclosure. Some steps may be performed before others even though the other steps are claimed or described first in this disclosure.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A system for reducing a response time of a transaction approval process through the use of a rule management server and a separate authorization server that specializes in the efficient approval of transactions, the system comprising:
a software-as-a-service (SaaS) platform comprising a graphical user interface configured to generate a portal for a plurality of clients to each specify one or more transaction rules associated with accounts of each client, the plurality of clients comprising a first client and a second client, wherein available transaction rules comprise a combination of available restrictions that include transaction category restrictions, named entity restrictions, dynamic rule restrictions;
the rule management server in communication with the SaaS platform, the rule management server having a first response time in applying a transaction rule, the rule management server comprising a first processor and first memory, the first memory configured to store a first set of code instructions, the first set of code instructions, when executed by the first processor, causes the first processor to:
store a first volume of data associated with the first client of the SaaS platform and a second volume of data associated with the second client of the SaaS platform,
store a third volume of data associated with a plurality of fields of third-party named entities,
receive a first transaction rule for approving transactions associated with the first client and a second transaction rule for approving transactions associated with the second client, wherein the first transaction rule includes a dynamic rule restriction that dynamically restricts transactions based on conditions of the first client, and wherein the second transaction rule includes a transaction category restriction and a third-party named entity restriction,
extract a first set of tags from the first transaction rule, the first set of tags identifying columns in the first volume of data that store data relevant to the first transaction rule;
extract a second set of tags from the second transaction rule, the second set of tags identifying columns of the third volume of data for the third-party named entity restriction to apply based on relevant fields of the third-party named entities,
identify a first set of columns in the first volume of data based on the first set tags included in the first transaction rule and a second set of columns in the third volume of data based on the second set of tags included in the second transaction rule, and
filter the first volume of transaction data to generate a first reduced volume of data and the second volume of transaction data to generate a second reduced volume of data, the first reduced volume of data comprising data in one or more columns in the identified first set of columns, the second reduced volume of data comprising data in one or more columns in the identified second set of columns; and
the authorizer server configured to approve transactions in real time, the authorizer server in communication with the rule management server, the rule management server being a separate server from the authorizer server, the authorizer server having a second response time in applying a transaction rule using a reduced volume of data, the second response time being shorter than the first response time due to the reduced volume of data, the authorizer server comprising a second processor and second memory, the second memory configured to store a second set of code instructions, the second set of code instructions, when executed by the second processor, causes the second processor to:
receive, from a transmission by the rule management server, the first reduced volume of data, the second reduced volume of data, the first transaction rule, and the second transaction rule,
store the first reduced volume of data and the second reduced volume of data in the authorizer server, the first reduced volume of data being a replication of a subset of the first volume of data that is stored in the rule management server, the second reduced volume of data being a replication of a subset of the third volume of data that is stored in the rule management server related to third-party named entities;
refresh, periodically, the first reduced volume of data through an application programming interface between the authorizer server and the rule management server, to receive dynamic conditions of the first client,
determine a condition of the dynamic rule restriction of the first transaction rule based on the received dynamic conditions of the first client,
receive a transaction data payload related to a pending transaction associated with an account of the first client,
identifying the first transaction rule governing the pending transaction,
parse one or more data fields in the transaction data payload that are identified by the first transaction rule,
generate a query for the first reduced volume of data stored in the authorizer server to compare the parsed data fields in the transaction data payload with the first reduced volume of data, and
conduct a real-time transaction approval process for the pending transaction using the first transaction rule, the parsed data fields, and the first reduced volume of data.

2. The system of claim 1, wherein the authorizer server is associated with an authorizer data store that partially replicates the volume of data, the partially replicated data being the reduced volume of data.

3. The system of claim 1, wherein the second processor and the second memory are different from and operate independently of the first processor and the first memory, and wherein the second set of code instructions is different from the first set of code instructions.

4. The system of claim 1, wherein the third-party named entity restriction of the second transaction rule includes a whitelist or a blacklist of a set of one or more specific named entities.

5. The system of claim 4, wherein identifying the second transaction rule governing the pending transaction comprises identifying a specific named entity through a named entity identification process, wherein the named entity identification process comprises:
parsing a version of merchant named entity name from the transaction data payload;
matching the version of the named entity name to an existing named entity name table; and
determining an identity of the specific named entity associated with the transaction data payload.

6. The system of claim 5, wherein matching the version of the named entity name to an existing named entity name table comprises constructing the existing named entity name table from the transaction data associated with different clients of the SaaS platform.

7. The system of claim 4, wherein identifying the second transaction rule governing the pending transaction comprises identifying a specific named entity with a machine learning model, wherein the machine learning model is iteratively trained by a set of training samples, at least one of training sample comprises a label of a named entity identity and a past transaction data payload.

8. The system of claim 1, wherein one of the first transaction rule or second transaction rule includes a per transaction limit that limits the maximum amount of spending on each transaction.

9. The system of claim 1, wherein the first transaction rule includes an organization spending limit that limits a total amount of spending of the organization, and wherein transactions of accounts of the organization are aggregated towards the total amount of spending of the organization.

10. The system of claim 1, wherein the first set of code instructions, when executed by the first processor, further causes the first processor to:
  receive a command from one of the first client or the second client to apply the first or second transaction rule to a plurality of credit cards; and
  sending a plurality of invitations to employees of the client for accepting the plurality of credit cards.

11. The system of claim 1, wherein the transaction category restriction corresponds to a merchant category code (MCC).

12. The system of claim 1, wherein the query is made locally without being transmitted to the rule management server.

13. A computer-implemented method for reducing a response time of a transaction approval process through the use of a rule management server and a separate authorization server that specializes in the efficient approval of transactions, the method comprising:
  storing a first volume of transaction data associated with a first client of a software-as-a-service (SaaS) platform and a second volume of data associated with a second client of the SaaS platform;
  storing a third volume of data associated with a plurality of fields of third-party named entities;
  receiving a first transaction rule for approving transactions associated with the first client and a second transaction rule for approving transactions associated with the second client, wherein the first transaction rule includes a dynamic rule restriction that dynamically restricts transactions based on conditions of the first client, and wherein the second transaction rule includes a transaction category restriction and a third-party named entity restriction;
  extracting a first set of tags from the first transaction rule, the first set of tags identifying columns in the first volume of data that store data relevant to the first transaction rule;
  extracting a second set of tags from the second transaction rule, the second set of tags identifying columns of the third volume of data for the third-party named entity restriction to apply based on relevant fields of the third-party named entities,
  identifying a first set of columns in the first volume of data based on the first set tags included in the first transaction rule and a second set of columns in the third volume of data based on the second set of tags included in the second transaction rule;
  filtering the first volume of transaction data to generate a first reduced volume of data and the second volume of transaction data to generate a second reduced volume of data, the first reduced volume of data comprising data in one or more columns in the identified first set of columns, the second reduced volume of data comprising data in one or more columns in the identifies second set of columns; and
  transmitting the first reduced volume of data, the second reduced volume of data, the first transaction rule, and the second transaction rule from the rule management server to the authorizer server, the rule management server having a first response time in applying a transaction rule and the authorizer server having a second response time in applying a transaction rule using a reduced volume of data, the second response time being shorter than the first response time, wherein the authorizer server is configured to store the first reduced volume of data and the second reduced volume of data in the authorizer server, the first reduced volume of data being a replication of a subset of the first volume of data that is stored in the rule management server, the second reduced volume of data being a replication of a subset of the third volume of data that is stored in the rule management server related to third-party named entities, periodically refresh the first reduced volume of data through an application programming interface between the authorizer server and the rule management server to receive dynamic conditions of the first client, determine a condition of the dynamic rule restriction of the first transaction rule based on the received dynamic conditions of the first client, and wherein the authorizer server, responsive to receiving a transaction data payload related to a pending transaction associated with an account of the first client, is configured to identify the first transaction rule governing the pending transaction, parse one or more data fields in the transaction data payload that are identified by the first transaction rule, generate a query for the first reduced volume of data stored in the authorizer server to compare the parsed data fields in the transaction data payload with the first reduced volume of data, and conduct a real-time transaction approval process for the pending transaction using the first transaction rule, the parsed data fields, and the first reduced volume of data.

14. The computer-implemented method of claim 13, wherein the third-party named entity restriction of the second transaction rule includes a whitelist or a blacklist of a set of one or more specific named entities.

15. The computer-implemented method of claim 14, wherein the authorized server is configured to identify a specific named entity through a named entity identification process, wherein the named entity identification process comprises:
  receiving a transaction data payload;
  parsing a version of a named entity name from the transaction data payload;
  matching the version of the named entity name to an existing named entity name table; and
  determining an identity of the specific named entity associated with the transaction data payload.

16. The computer-implemented method of claim 15, wherein the authorized server is configured to construct the existing named entity name table from the transaction data associated with different clients of the SaaS platform.

17. The computer-implemented method of claim 14, wherein the authorized server is configured to identify a specific named entity with a machine learning model, wherein the machine learning model is iteratively trained by a set of training samples, at least one of training sample comprises a label of a named entity identity and a past transaction data payload.

18. The computer-implemented method of claim 13, wherein one of the first transaction rule or second transaction rule includes a per transaction limit that limits the maximum amount of spending on each transaction.

19. The computer-implemented method of claim 13, wherein the first transaction rule includes an organization spending limit that limits a total amount of spending of the organization, and wherein transactions of accounts of the organization are aggregated towards the total amount of spending of the organization.

20. The computer-implemented method of claim 13, wherein the transaction category restriction corresponds to a merchant category code (MCC).

\* \* \* \* \*